United States Patent
Goldberg

(10) Patent No.: US 9,542,318 B2
(45) Date of Patent: Jan. 10, 2017

(54) TEMPORARY CACHE MEMORY EVICTION

(71) Applicant: Infinidat LTD., Herzliya (IL)

(72) Inventor: Alex Goldberg, Rehovot (IL)

(73) Assignee: INFINIDAT LTD., Herzliya (IL)

( * ) Notice: Subject to any disclaimer, the term of this patent is extended or adjusted under 35 U.S.C. 154(b) by 49 days.

(21) Appl. No.: 14/602,374

(22) Filed: Jan. 22, 2015

(65) Prior Publication Data

US 2016/0217074 A1 Jul. 28, 2016

(51) Int. Cl.
G06F 12/12 (2016.01)
G06F 12/08 (2016.01)

(52) U.S. Cl.
CPC ......... *G06F 12/0833* (2013.01); *G06F 12/128* (2013.01); *G06F 2212/621* (2013.01); *G06F 2212/69* (2013.01)

(58) Field of Classification Search
CPC .... G06F 3/0611; G06F 3/0652; G06F 3/0655; G06F 12/12; G06F 12/126; G06F 12/128; G06F 12/0862; G06F 12/0871; G06F 12/0888; G06F 2212/45; G06F 2212/69
See application file for complete search history.

(56) References Cited

U.S. PATENT DOCUMENTS

| | | | | |
|---|---|---|---|---|
| 8,639,658 B1* | 1/2014 | Kumaresan | ........... | G06F 3/0641 707/609 |
| 9,286,079 B1* | 3/2016 | Roden | ................... | G06F 9/4401 |
| 2007/0186045 A1* | 8/2007 | Shannon | ............... | G06F 12/128 711/133 |
| 2010/0235579 A1* | 9/2010 | Biles | ..................... | G06F 12/127 711/125 |
| 2012/0124296 A1* | 5/2012 | Bryant | ................. | G06F 9/3861 711/136 |
| 2012/0246411 A1* | 9/2012 | Birka | .................... | G06F 12/121 711/133 |
| 2013/0145104 A1* | 6/2013 | Hsu | ........................ | G06F 12/126 711/141 |
| 2013/0198459 A1* | 8/2013 | Joshi | ..................... | G06F 12/084 711/130 |
| 2013/0205092 A1* | 8/2013 | Roy | ...................... | G06F 12/084 711/130 |
| 2013/0268733 A1* | 10/2013 | Narayanan | .......... | G06F 12/0888 711/119 |
| 2016/0062899 A1* | 3/2016 | Cain, III | ................. | G06F 9/461 711/122 |
| 2016/0092677 A1* | 3/2016 | Patel | ...................... | G06F 21/55 726/23 |

* cited by examiner

*Primary Examiner* — Hal Schnee
(74) *Attorney, Agent, or Firm* — Reches Patents

(57) ABSTRACT

A method for managing a cache memory of a storage system, the method may include storing a first retrieval metadata of a first data that is cached in the cache memory, in response to an expected or an actual occurrence of a cache memory consuming event; wherein the cache memory consuming event involves storing second data in the cache memory for a second caching period; replacing, in the cache memory, the first data by the second data; wherein the second caching period is a fraction of a first caching period associated with the first data; and evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata.

24 Claims, 6 Drawing Sheets

TEMPORARY CACHE MEMORY EVICTION

BACKGROUND

A storage system usually serves one or more host computers. The storage system is expected to respond to input output (IO) requests from the one or more host computers as fast as possible.

Cache memories are used for storing active data so as to shorten data access times and reduce latency I/O operations. A cache memory stores data that is likely to be accessed, for example the most frequently used data, the most recently used data, the least recently used data, and data determined to be accessed according to access patterns detected by prefetch algorithms.

Cache memories may lose their effectiveness when they are overloaded.

There is a growing need to improve the performance of cache memories.

SUMMARY

According to an embodiment of the invention there may be provided a method, the method may include: storing a first retrieval metadata of a first data that is cached in the cache memory, in response to an expected or an actual occurrence of a cache memory consuming event; wherein the cache memory consuming event involves storing second data in the cache memory for a second caching period; replacing, in the cache memory, the first data by the second data; wherein the second caching period is a fraction of a first caching period associated with the first data; and evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata.

The method may include receiving an indication about the actual or expected occurrence of the cache memory consuming event.

The method may include detecting, by the storage system, the actual or expected occurrence of the cache memory consuming event.

The method may include detecting, by the storage system, the actual or expected occurrence of the cache memory consuming event by monitoring cache memory utilization patterns.

The method may include detecting, by the storage system, the actual or expected occurrence of the cache memory consuming event by monitoring access patterns of read requests sent to the storage system.

The cache memory consuming event may be a boot operation of a host computer coupled to the storage system.

The cache memory consuming event may include multiple boot operations of multiple virtual machines hosted by a host computer that may be coupled to the storage system, wherein the multiple boot operations at least partially overlap.

The first retrieval metadata may be stored in a permanent storage unit of the storage system.

The first retrieval metadata may be stored in the cache memory.

The storing of the first retrieval metadata, the replacing of the first data by the second data, the evicting of the second data and the retrieving of the first data form a cache memory manipulation process.

The method may include: calculating a first cost associated with an execution of the cache memory manipulation process; calculating a second cost associated with a lack of execution of the cache memory manipulation process; and determining whether to execute the cache memory manipulation process in response to the first and second costs.

Each one of the first and second costs may be indicative of a level of performance of the storage system.

The size of the second data may exceed 5 percent of a size of the cache memory.

The size of the second data may exceed 10 percent of a size of the cache memory.

The second caching period may end ends before an end of the first caching period.

The retrieving of the first data to the cache memory may occurs regardless of requests, from a host computer, to retrieve the first data—even at an absence of such a request (following the cache memory consuming event).

According to an embodiment of the invention there may be provided a non-transitory computer readable medium that stores instructions that once executed by a storage system causes the storage system to executed the stages of: storing first retrieval metadata of a first data that may be cached in a cache memory of the storage system, in response to an expected or an actual occurrence of a cache memory consuming event; wherein the cache memory consuming event involves storing second data in the cache memory for a second caching period; replacing, in the cache memory, the first data by the second data; wherein the second caching period may be a fraction of a first caching period associated with the first data; and evicting the second data from the cache memory and retrieving the first data to the cache memory at an end of the cache memory consuming event; wherein the retrieving of the first data involves retrieving the first data from a storage unit that differs from the cache memory while using the first retrieval metadata.

According to an embodiment of the invention there may be provided a storage system that may include a cache memory, a controller and a storage unit that differs from the cache memory; wherein the storage system may be configured to store first retrieval metadata of a first data that may be cached in the cache memory, in response to an expected or an actual occurrence of a cache memory consuming event; wherein the cache memory consuming event involves storing second data in the cache memory for a second caching period; wherein the controller may be configured to control a replacement, in the cache memory, the first data by the second data; wherein the second caching period may be a fraction of a first caching period associated with the first data; and to control an eviction of the second data from the cache memory and a retrieval of the first data to the cache memory in response to an actual or estimated end of the cache memory consuming event; wherein the retrieval of the first data involves retrieving the first data from the storage unit while using the first retrieval metadata.

According to an embodiment of the invention there may be provided a method that may include: calculating a first cost associated with an execution of a cache memory manipulation process; determining whether to execute the cache memory manipulation process in response to the first cost; and executing the cache memory manipulation process when it may be determined to execute the cache memory manipulation process; wherein the execution of the cache memory manipulation process may include: storing first retrieval metadata of a first data that may be cached in the cache memory, in response to an expected or an actual occurrence of a cache memory consuming event; wherein the cache memory consuming event involves storing second data in the cache memory for a second caching period; replacing, in the cache memory, the first data by the second data; wherein the second caching period may be a fraction of a first caching period associated with the first data; and evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata.

The method may include calculating a second cost associated with a lack of execution of the cache memory manipulation process; and wherein the determining whether to execute the cache memory manipulation process in also responsive to the second costs.

The first cost may be indicative of a level of performance of the storage system.

The first cost may be indicative of a size of the second data and of a length of the second caching period.

The first cost may be indicative of an expected or actual popularity of the first data.

According to an embodiment of the invention there may be provided a non-transitory computer readable medium that stores instructions that once executed by a storage system causes the storage system to executed the stages of: calculating a first cost associated with an execution of a cache memory manipulation process; determining whether to execute the cache memory manipulation process in response to the first cost; and executing the cache memory manipulation process when it may be determined to execute the cache memory manipulation process; wherein the execution of the cache memory manipulation process may include: storing first retrieval metadata of a first data that may be cached in the cache memory, in response to an expected or an actual occurrence of a cache memory consuming event; wherein the cache memory consuming event involves storing second data in the cache memory for a second caching period; replacing, in the cache memory, the first data by the second data; wherein the second caching period may be a fraction of a first caching period associated with the first data; and evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata.

According to an embodiment of the invention there may be provided a storage system that may include a cache memory, a controller and a storage unit that differs from the cache memory; wherein the controller may be configured to calculate a first cost associated with an execution of a cache memory manipulation process; determine whether to execute the cache memory manipulation process in response to the first cost; and execute the cache memory manipulation process when it may be determined to execute the cache memory manipulation process; wherein the execution of the cache memory manipulation process may include: storing first retrieval metadata of a first data that may be cached in the cache memory, in response to an expected or an actual occurrence of a cache memory consuming event; wherein the cache memory consuming event involves storing second data in the cache memory for a second caching period; replacing, in the cache memory, the first data by the second data; wherein the second caching period may be a fraction of a first caching period associated with the first data; and evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
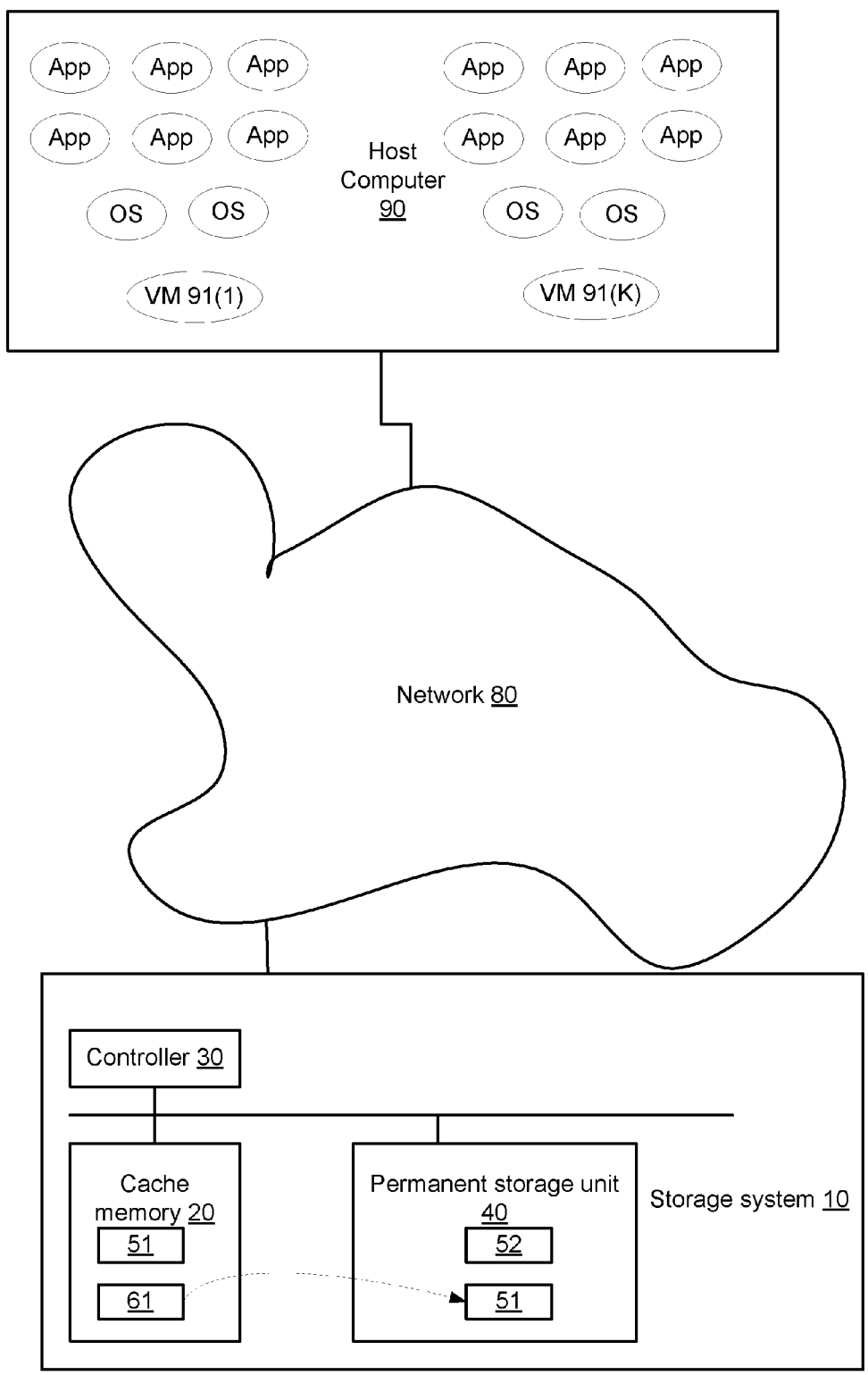
FIG. 1 illustrates a storage system and a host computer according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any reference to the terms "comprising", "comprise", "comprises" and "including" should also be applied mutatis mutandis to a reference to the terms "consisting" and/or "consisting essentially of". Thus, for example, any reference to a method that includes various steps may refer to a method that may include additional steps but may also refer to a method that is limited only (or essentially limited to only) these various steps.

Some events (referred to as cache memory consuming events) may cause a sudden increase in the cache utilization for a short time period, where the data (temporary data) that is read to the cache memory is not expected to be re-used or is only expected to be used for a very short time period. The cache memory consuming event may be triggered by the storage system, or by a host computer that may host an application that accesses the storage system.

An example of a cache memory consuming event is a boot of a host computer, which may involve restarting the operation system hosted by the host computer and launching applications—operations that produce IO requests towards the storage system.

A cache memory consuming event may occur, for example, when host computers are initialized concurrently and cause a steep increment in cache utilization.

A cache memory consuming event may be, for example, a boot storm. A boot storm occurs when multiple virtual machines boot concurrently. This may occur when a host computer that hosts multiple virtual machines restarts. The number of virtual machines hosted by the host computer may exceed one hundred, few hundreds and even one or few thousands. A boot storm may involve multiple boot operations that at least partially overlap.

A boot storm may result in a sharp rise in input/output (I/O) requests, which cause caching a large amount of temporary data, especially by prefetch mechanisms. In many cases the temporary data will not be needed after the boot storm ends.

Prefetch mechanisms can detect an access pattern that is typical to a boot event and perform a prefetch to the cache of data that is expected to be read during the boot, so as to accelerate the boot. The prefetched data can consume a substantial amount of cache resources that will be useless once the boot storm is over.

There is provided a method, storage system and a computer readable medium for managing a cache memory when cache memory consuming events actually occur or are expected to occur.

As indicated above the temporary data occupies space on the expense of cached data (also referred to as first data) that may be more popular (frequently used data or data expected to be used in the near future) that need to be evicted in order to prepare space for the temporary data.

According to the invention, when such cache memory consuming event is detected and before the first data is evicted from the cache memory for the sake of the temporary data, retrieval metadata of the first data is saved. The retrieval metadata is metadata that is associated with first data and includes information required to read (retrieve) the first data from a storage unit (such as one or more permanent storage units) that differs from the cache memory, such as a physical address in the permanent storage and a size to be read. The retrieval metadata may further include information required to identify the first data by the host computer, for example: a logical address known to the host computers. The storage system may be configured to manage volumes provided to the host computer, where the volumes are mapped to the permanent storage unit.

When it is estimated that the cache memory consuming event is over and/or the temporary data will not be needed anymore, the retrieval metadata is used to re-read the first data from the storage unit into the cache memory, even before an accessing entity (such as a host computer or an entity of the storage system) requests to read the first data, thus future access requests will profit a low latency enabled by servicing the first data from the cache memory.

A boot event and especially a boot storm event may be detected and regarded as a cache memory consuming event. Detecting a boot storm event can be based on typical volume addresses requested to be read by at least a certain number of hosts, or typical volume addresses requested to be read from at least a certain number of volumes. For example, a boot process generally uses the start addresses (or other predefined addresses) of the volume to read information required for booting. If at least e.g., five read requests refer to start addresses of five different volumes, it can be detected that a boot storm is occurring.

Figure 2:
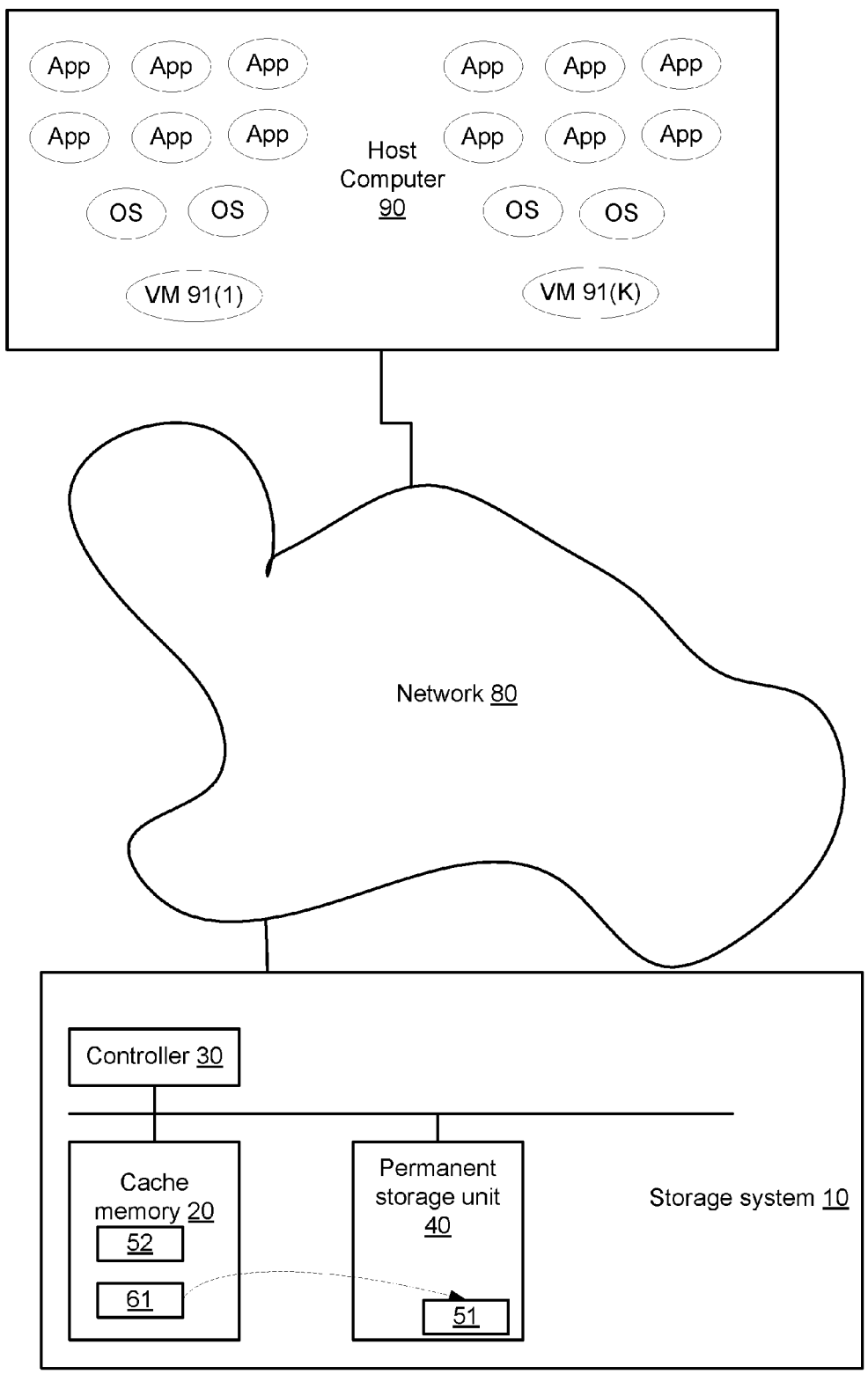
FIG. 2 illustrates a storage system and a host computer according to an embodiment of the invention.
Figure 3:
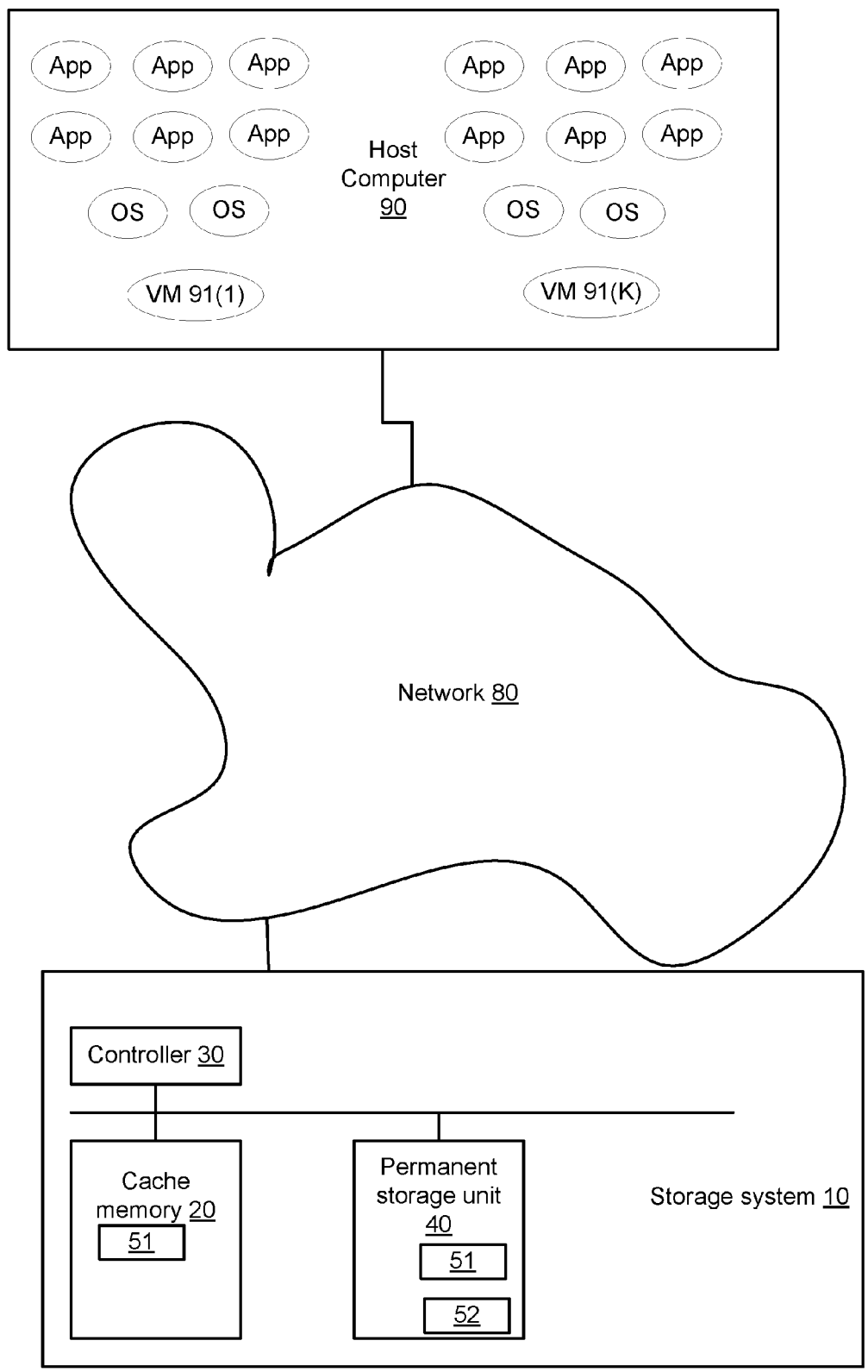
FIG. 3 illustrates a storage system and a host computer according to an embodiment of the invention.

FIGS. 1-3 illustrate a storage system 10, a network 80 and a host computer 90 according to an embodiment of the invention.

Storage system 10 is coupled to one or more host computers such as host computer 90 via network 80. Network 80 can be any type of network, or a combination of networks of various types such as a wireless network, a wired network, a local area network, the Internet, and the like.

Host computer 90 hosts virtual machines 91(1)-91(K), K being a positive integer and each virtual machine hosts an operating systems (OS) and multiple applications (APP).

Storage system 10 may be a mass storage system capable of storing more than one petabyte, but this is not necessarily so.

Storage system 10 has a cache memory 20, a controller 30 and a storage unit such as permanent storage unit 40. The permanent storage unit 40 may be one or more solid state drivers, one or more hard disks, and the like.

Controller 30 may include one or more processors, one or more computers, and the like.

FIGS. 1-3 illustrate some data items such as first data 51, second data 52 and first retrieval metadata 61.

FIG. 1 illustrates a first point in time, before an occurrence of a cache memory consuming event, in which the second data 52 is stored in the permanent storage unit 40, the first data 51 is stored in the cache memory and the first retrieval metadata 61 is stored in the cache memory 20. It is noted that the first retrieval data 61 may be stored in permanent storage unit 40 or even in both permanent storage unit 40 and cache memory 20. It is further noted that the first data 51 is also stored in the permanent storage unit 40. The first retrieval metadata 61 points to the location of first data 51 in the permanent storage unit 40.

The storage system 10 is configured to store first retrieval metadata of first data 51 that is cached in the cache memory 20, in response to an expected or an actual occurrence of a cache memory consuming event. The cache memory consuming event involves storing second data in the cache memory for a second caching period.

The controller 30 may be configured to control a replacement, in the cache memory 20, of the first data 51 by the second data 52. The second caching period is a fraction of a first caching period associated with the first data 51.

The first caching period may be the time period in which the first data is expected to be accessed and worth being saved in the cache memory.

Thus—the second data is expected to be cached for a much shorter duration than the first data 51—as the first data 51 is more popular or should be stored in the cache memory 20 for longer durations in view of any cache memory management rule. It is expected that the first data 51 will be requested by the host computer 90 even after the completion of the cache memory consuming event.

FIG. 2 illustrates a second point in time, during a cache memory consuming event, in which the second data 52 is stored in the cache memory 20, the first data is evicted from the cache memory 20 and is only stored in the permanent storage unit 40 and the first retrieval metadata 61 is stored in the cache memory 20.

When the cache memory consuming event actually ends, or when the cache memory consuming event is expected to end, or when the second data 52 becomes irrelevant—the controller 30 is configured to control an eviction of the second data 52 from the cache memory 20 and a retrieval of the first data 51 to the cache memory 20 in response to an actual or estimated end of the cache memory consuming event. The retrieval of the first data 51 involves retrieving the first data 51 from the storage unit while using the first retrieval metadata 61.

FIG. 3 illustrates a third point in time in which the second data 52 is stored only in the permanent storage unit 40 after being evicted from the cache memory, and the first data 51 is stored in the cache memory. The first retrieval metadata 61 (not shown) may be evicted from the cache memory 20, stored in the cache memory 20 for future use, or may be stored in the permanent storage unit 40.

Figure 4:
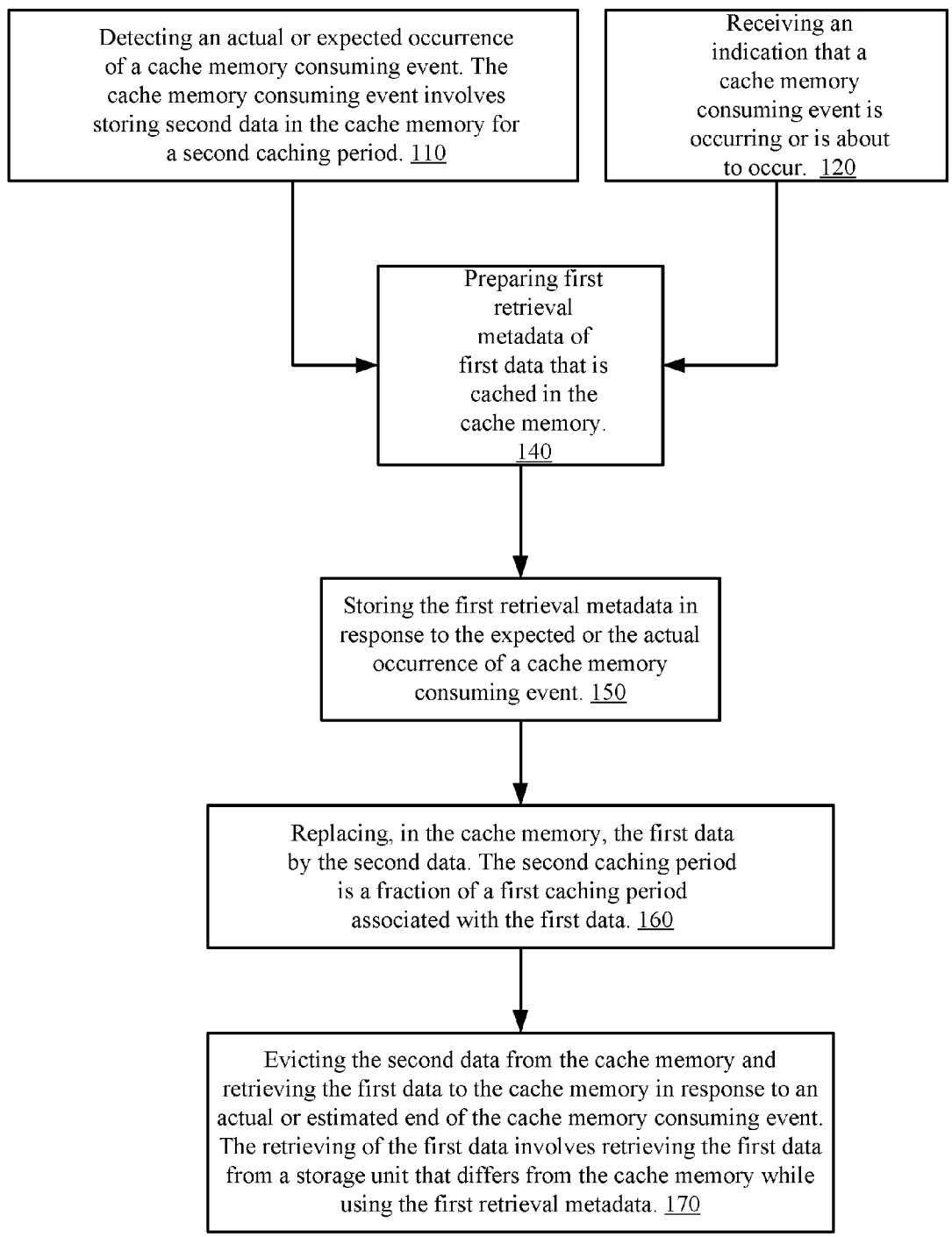
FIG. 4 illustrates a method according to an embodiment of the invention.

FIG. 4 illustrates method 100 according to an embodiment of the invention.

Method 100 may start by either one of stages 110 and 120.

Stage 110 may include detecting an actual or an expected occurrence of a cache memory consuming event. The cache memory consuming event involves storing second data in the cache memory for a second caching period. The cache memory consuming event may include storing second data of substantial size. What amount to substantially size may be a certain fraction of the size of the cache memory (such as a third of the cache memory) or data that exceeds a certain threshold (such as few tens of megabytes).

Stage 110 may include monitoring cache memory utilization patterns and/or access patterns to volumes in the permanent storage and/or access patterns of read requests.

This may include detecting cache memory utilization patterns that indicate of an occurrence of the cache memory consuming event. For example—this may involve detecting boot patterns such as accesses to predefined addresses (such as but not limited to beginning of volumes) that are associated with boot operations. Yet for another example—this may include studying cache memory utilization patterns that are associated with events that are previously flagged (for example by the host computer) as cache memory consuming event.

Stage 120 may include receiving an indication that a cache memory consuming event is occurring or is about to occur. For example—a host computer may inform the storage system that a boot storm is occurring or is about to occur.

Stages 110 and 120 may be followed by stage 140 of preparing first retrieval metadata of first data that is cached in the cache memory. Stage 140 may include (or may be preceded by) selecting the first data out of data that is currently cached. The selection may be responsive to one or more parameters such as priority, association with a quality of service level, popularity, and the like.

Stage 140 may be followed by stage 150 of storing the first retrieval metadata in response to the expected or the actual occurrence of a cache memory consuming event. It is noted that retrieval metadata may associated with any data stored in the cache memory. Thus stage 140 may be followed by stage 160. Alternatively, the first retrieval metadata may be stored in a dedicated region of the cache memory and/or the permanent storage unit. Alternatively, stage 160 may include storing a link to the first retrieval metadata in a dedicated location.

The first retrieval metadata may be stored in the cache memory or in another storage unit such as a permanent storage unit of the storage system.

Stage 150 may be followed by stage 160 of replacing, in the cache memory, the first data by the second data. The second caching period is a fraction of a first caching period associated with the first data.

The first caching period is the time period in which the first data is expected to be accessed in a manner that it is worth being saved in the cache memory.

Stage 160 may be followed by stage 170 of evicting the second data from the cache memory and retrieving the first data to the cache memory in response to an actual or estimated end of the cache memory consuming event. The retrieving of the first data involves retrieving the first data from a storage unit that differs from the cache memory while using the first retrieval metadata. The estimated end can be a certain amount of time since the detection of the actual or expected occurrence of the cache memory consuming event, e.g., predetermined number of seconds or predetermined number of minutes. The end of the cache memory consuming event can be estimated when a pattern of volume accesses or a pattern of the cache memory utilization ceases to correspond to a pattern typical to a cache memory consuming event. The actual end of the cache memory consuming event can be determined by receiving an indication that the cache memory consuming event is over.

The retrieving of the first data to the cache memory occurs regardless of requests, from a host computer, to retrieve the first data. Thus—even before any request to retrieve the first data is received by the storage system (after the end of the cache memory consuming event)—stage 170 may be executed.

The cache memory consuming event may involve caching a substantial amount of second data. For example, the size of the second data (that may justify the cache memory manipulation process) may exceed 5, 10, 15, 20, 25, 30, 35 percent (and even more) of the size of the cache memory.

Stages 140, 150, 160 and 170 form a cache memory manipulation process. The cache memory manipulation process may be executed whenever a cache memory consuming event occurs (or is expected to occur).

According to an embodiment of the invention method 100 may include determining whether to perform the cache memory manipulation process. Accordingly—in some cases the cache memory consuming event may trigger the cache memory manipulation process and in other cases the cache memory consuming event does not trigger the cache memory manipulation process.

Figure 5:
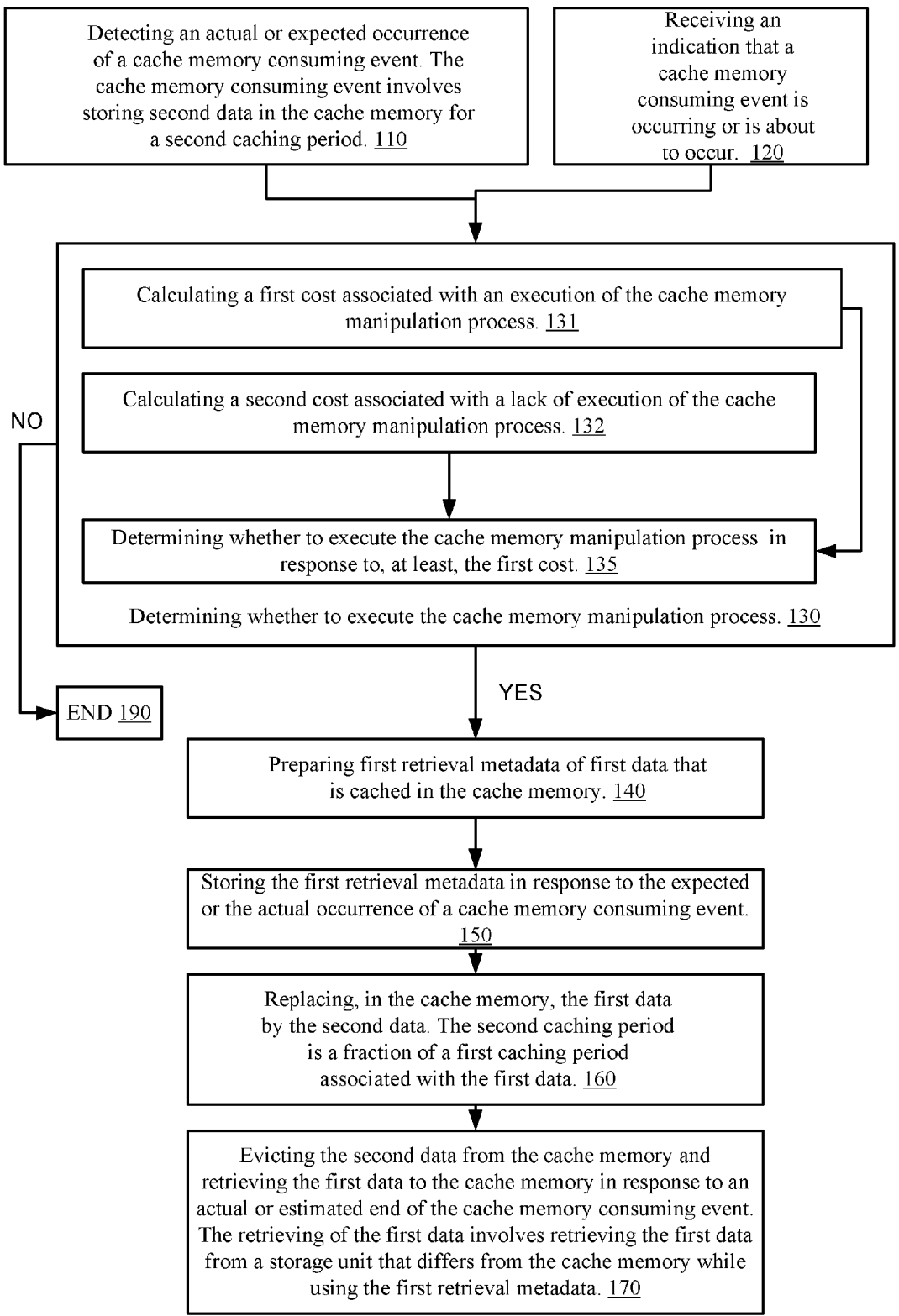
FIG. 5 illustrates a method according to an embodiment of the invention.

FIG. 5 illustrates method 101 according to an embodiment of the invention.

Method 101 differs from method 100 by including stage 130.

Stage 130 occurs before stage 140 and after stages 110 and 120.

Stage 130 may include, for example, calculating (131) a first cost associated with an execution of the cache memory manipulation process and determining (135) whether to execute the cache memory manipulation process in response to, at least, the first cost.

If it is determined to execute the cache memory manipulation process then stage 130 is followed by stage 140. Else—the process ends (stage 190)—the first data is evicted from the cache memory without generating and storing the first retrieval metadata, and the second data is evicted when other data (such as but not limited to the first data) should be cached.

According to an embodiment of the invention stage 130 may include calculating (132) a second cost associated with a lack of execution of the cache memory manipulation process. The determining (135) may be responsive to the first and second costs.

Each one of the first and second costs may be indicative of a level of performance of the storage system. For example—the first and second costs may indicate the time required for caching the second data and responding to requests to retrieve the first data after the completion of the cache memory consuming event.

Figure 6:
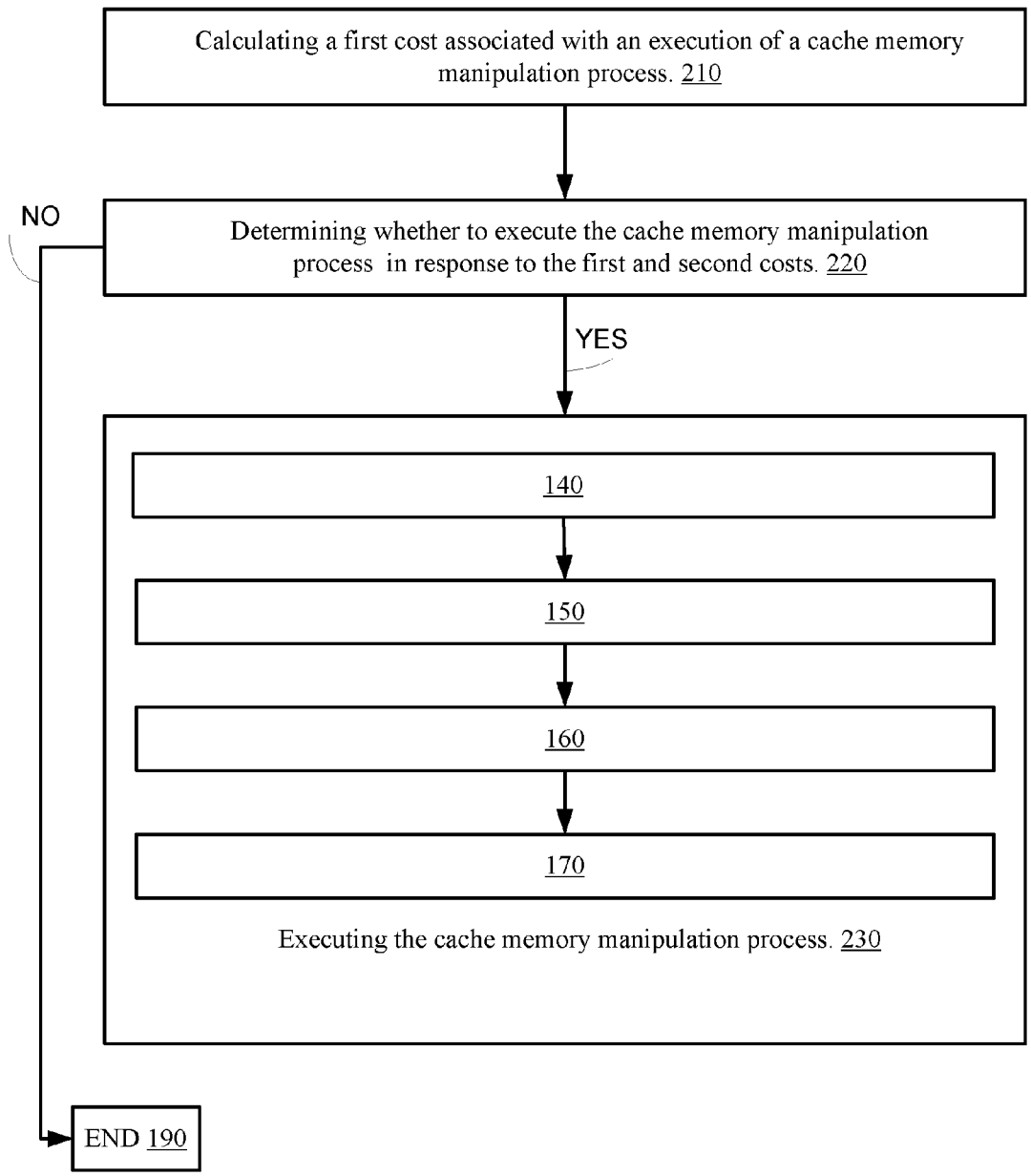
FIG. 6 illustrates a method according to an embodiment of the invention.

FIG. 6 illustrates method 102 according to an embodiment of the invention.

Method 102 may start by stage 210 of calculating a first cost associated with an execution of a cache memory manipulation process.

Stage 210 may be preceded by any one of stages 110 and 120 of method 100.

Stage 210 may be followed by stage 220 of determining whether to execute the cache memory manipulation process in response to the first and second costs.

Stage 220 may be followed by stage 230 if it is determined to execute the cache memory manipulation process. Else—stage 220 may be followed by stage END 190 in which the cache memory manipulation process is not executed.

Stage 230 may include executing the cache memory manipulation process.

Stage 230 may include stages 140, 150, 160 and 170 of method 100.

Stage 210 may include calculating a second cost associated with a lack of execution of the cache memory manipulation process. In this case stage 220 is also responsive to the second costs.

The first cost may be indicative of a level of performance (such as latency) of the storage system.

The first cost may be indicative of a size of the second data and of a length of the second caching period.

The first cost may be indicative of an expected or actual popularity of the first data.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (IO) devices. When executing the computer program, the computer system processes information according to the computer program and produces resultant output information via IO devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for managing a cache memory of a storage system, the method comprises:
    calculating a first cost associated with an execution of a cache memory manipulation process;
    determining whether to execute the cache memory manipulation process in response to the first cost;
    if it is determined to perform the cache memory manipulation process, executing the following steps:
        storing a first retrieval metadata of a first data that is cached in the cache memory, in response to an expected or an actual occurrence of a cache memory consuming event; wherein the cache memory consuming event involves storing second data in the cache memory for a second caching period;
        replacing, in the cache memory, the first data by the second data; wherein the second caching period is a fraction of a first caching period associated with the first data; and
        evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata;

wherein the first cost is indicative of a size of the second data and of a length of the second caching period.

2. The method according to claim 1 comprising receiving an indication about the actual or expected occurrence of the cache memory consuming event.

3. The method according to claim 1 comprising detecting, by the storage system, the actual or expected occurrence of the cache memory consuming event.

4. The method according to claim 1 comprising detecting, by the storage system, the actual or expected occurrence of the cache memory consuming event by monitoring cache memory utilization patterns.

5. The method according to claim 1 comprising detecting, by the storage system, the actual or expected occurrence of the cache memory consuming event by monitoring access patterns of read requests sent to the storage system.

6. The method according to claim 1 wherein the cache memory consuming event is a boot operation of a host computer coupled to the storage system.

7. The method according to claim 1 wherein the cache memory consuming event comprises multiple boot operations of multiple virtual machines hosted by a host computer that is coupled to the storage system, wherein the multiple boot operations at least partially overlap.

8. The method according to claim 1 wherein the first retrieval metadata is stored in a permanent storage unit of the storage system.

9. The method according to claim 1 wherein the first retrieval metadata is stored in the cache memory.

10. The method according to claim 1 wherein the storing of the first retrieval metadata, the replacing of the first data by the second data, the evicting of the second data and the retrieving of the first data form the cache memory manipulation process.

11. The method according to claim 10 comprising: calculating a second cost associated with a lack of execution of the cache memory manipulation process; and determining whether to execute the cache memory manipulation process in response to the first and second costs.

12. The method according to claim 11 wherein at least one of the first and second costs is indicative of a level of performance of the storage system.

13. The method according to claim 1 wherein the size of the second data exceeds 5 percent of a size of the cache memory.

14. The method according to claim 1 wherein the size of the second data exceeds 10 percent of a size of the cache memory.

15. The method according to claim 1 wherein the second caching period ends before an end of the first caching period.

16. The method according to claim 1 wherein the retrieving of the first data to the cache memory occurs regardless of requests, from a host computer, to retrieve the first data.

17. A non-transitory computer readable medium that stores instructions that once executed by a storage system causes the storage system to executed the stages of:
calculating a first cost associated with an execution of a cache memory manipulation process;
determining whether to execute the cache memory manipulation process in response to the first cost;
if it is determined to perform the cache memory manipulation process, executing the foil owing steps:
storing first retrieval metadata of a first data that is cached in a cache memory of the storage system, in response to an expected or an actual occurrence of a cache memory consuming event; wherein the cache memory consuming event involves storing second data in the cache memory for a second caching period;
replacing, in the cache memory, the first data by the second data; wherein the second caching period is a fraction of a first caching period associated with the first data; and
evicting the second data from the cache memory and retrieving the first data to the cache memory at an end of the cache memory consuming event; wherein the retrieving of the first data involves retrieving the first data from a storage unit that differs from the cache memory while using the first retrieval metadata;
wherein the first cost is indicative of a size of the second data and of a length of the second caching period.

18. A storage system comprising a cache memory, a controller and a storage unit that differs from the cache memory; wherein the storage system is configured to: calculate a first cost associated with an execution of a cache memory manipulation process; determine whether to execute the cache memory manipulation process in response to the first cost; if it is determined to perform the cache memory manipulation process, the storage system is configured to store first retrieval metadata of a first data that is cached in the cache memory, in response to an expected or an actual occurrence of a cache memory consuming event; wherein the cache memory consuming event involves storing second data in the cache memory for a second caching period; wherein the controller is configured to control a replacement, in the cache memory, of the first data by the second data; wherein the second caching period is a fraction of a first caching period associated with the first data; and to control an eviction of the second data from the cache memory and a retrieval of the first data to the cache memory in response to an actual or estimated end of the cache memory consuming event; wherein the retrieval of the first data involves retrieving the first data from the storage unit while using the first retrieval metadata; wherein the first cost is indicative of a size of the second data and of a length of the second caching period.

19. A method comprising:
calculating a first cost associated with an execution of a cache memory manipulation process;
determining whether to execute the cache memory manipulation process in response to the first cost; and
executing the cache memory manipulation process when it is determined to execute the cache memory manipulation process;
wherein the execution of the cache memory manipulation process comprises:
storing first retrieval metadata of a first data that is cached in the cache memory, in response to an expected or an actual occurrence of a cache memory consuming event; wherein the cache memory consuming event involves storing second data in the cache memory for a second caching period;
replacing, in the cache memory, the first data by the second data; wherein the second caching period is a fraction of a first caching period associated with the first data; and
evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata;

wherein the first cost is indicative of a size of the second data and of a length of the second caching period.

20. The method according to claim 19 comprising calculating a second cost associated with a lack of execution of the cache memory manipulation process; and wherein the determining whether to execute the cache memory manipulation process in also responsive to the second costs.

21. The method according to claim 19 wherein the first cost is further indicative of a level of performance of the storage system.

22. The method according to claim 19 wherein the first cost is further indicative of an expected or actual popularity of the first data.

23. A non-transitory computer readable medium that stores instructions that once executed by a storage system causes the storage system to executed the stages of:
  calculating a first cost associated with an execution of a cache memory manipulation process;
  determining whether to execute the cache memory manipulation process in response to the first cost; and
  executing the cache memory manipulation process when it is determined to execute the cache memory manipulation process; wherein the execution of the cache memory manipulation process comprises:
    storing first retrieval metadata of a first data that is cached in the cache memory, in response to an expected or an actual occurrence of a cache memory consuming event; wherein the cache memory consuming event involves storing second data in the cache memory for a second caching period;
    replacing, in the cache memory, the first data by the second data; wherein the second caching period is a fraction of a first caching period associated with the first data; and
    evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata;
  wherein the first cost is indicative of a size of the second data and of a length of the second caching period.

24. A storage system comprising a cache memory, a controller and a storage unit that differs from the cache memory; wherein the controller is configured to calculate a first cost associated with an execution of a cache memory manipulation process; determine whether to execute the cache memory manipulation process in response to the first cost; and execute the cache memory manipulation process when it is determined to execute the cache memory manipulation process; wherein the execution of the cache memory manipulation process comprises: storing first retrieval metadata of a first data that is cached in the cache memory, in response to an expected or an actual occurrence of a cache memory consuming event; wherein the cache memory consuming event involves storing second data in the cache memory for a second caching period; replacing, in the cache memory, the first data by the second data; wherein the second caching period is a fraction of a first caching period associated with the first data; and evicting the second data from the cache memory and retrieving the first data to the cache memory in response to an actual or estimated end of the cache memory consuming event; wherein the retrieving of the first data involves retrieving the first data from a storage unit that differs from the cache memory while using the first retrieval metadata; wherein the first cost is indicative of a size of the second data and of a length of the second caching period.

* * * * *